Feb. 7, 1956  W. F. KARSTENS ET AL  2,733,472
HEATED WINDSHIELD WIPER BLADE
Filed Nov. 12, 1952  2 Sheets-Sheet 1
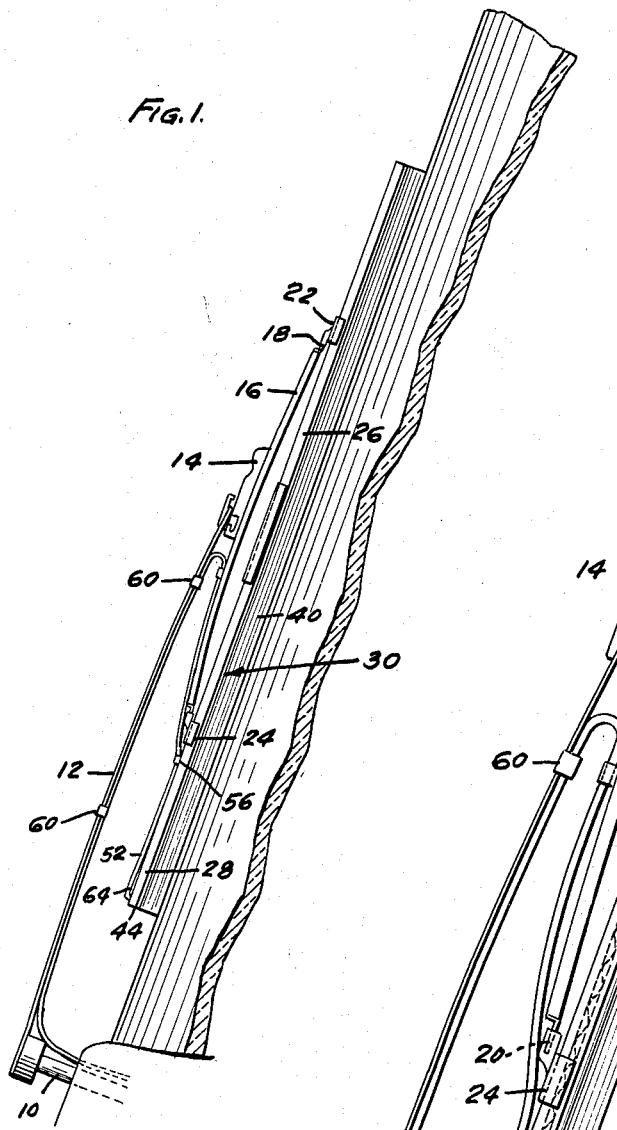
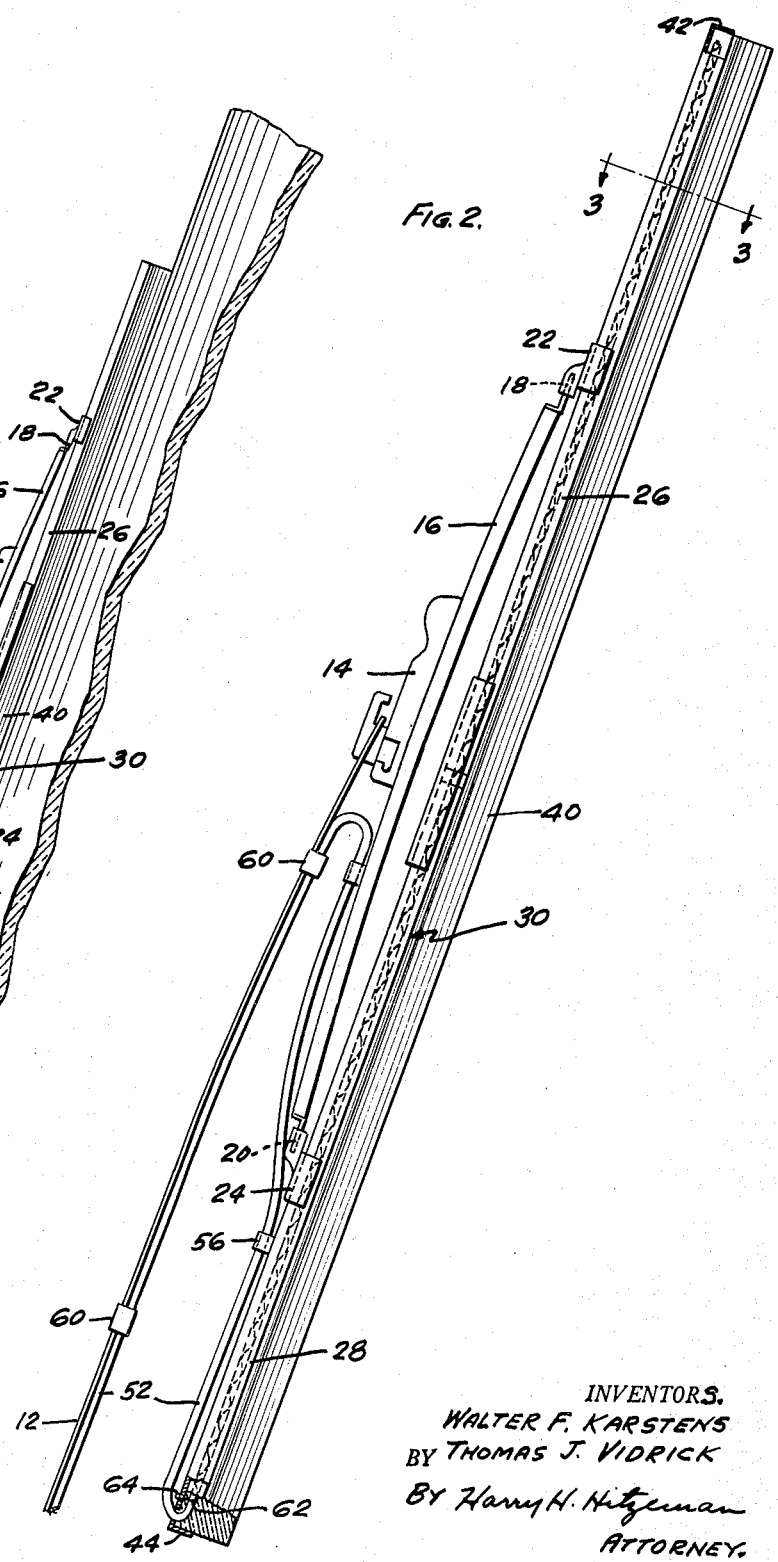
INVENTORS.
WALTER F. KARSTENS
BY THOMAS J. VIDRICK
BY Harry H. Hitzeman
ATTORNEY.

Feb. 7, 1956 W. F. KARSTENS ET AL 2,733,472
HEATED WINDSHIELD WIPER BLADE
Filed Nov. 12, 1952 2 Sheets-Sheet 2
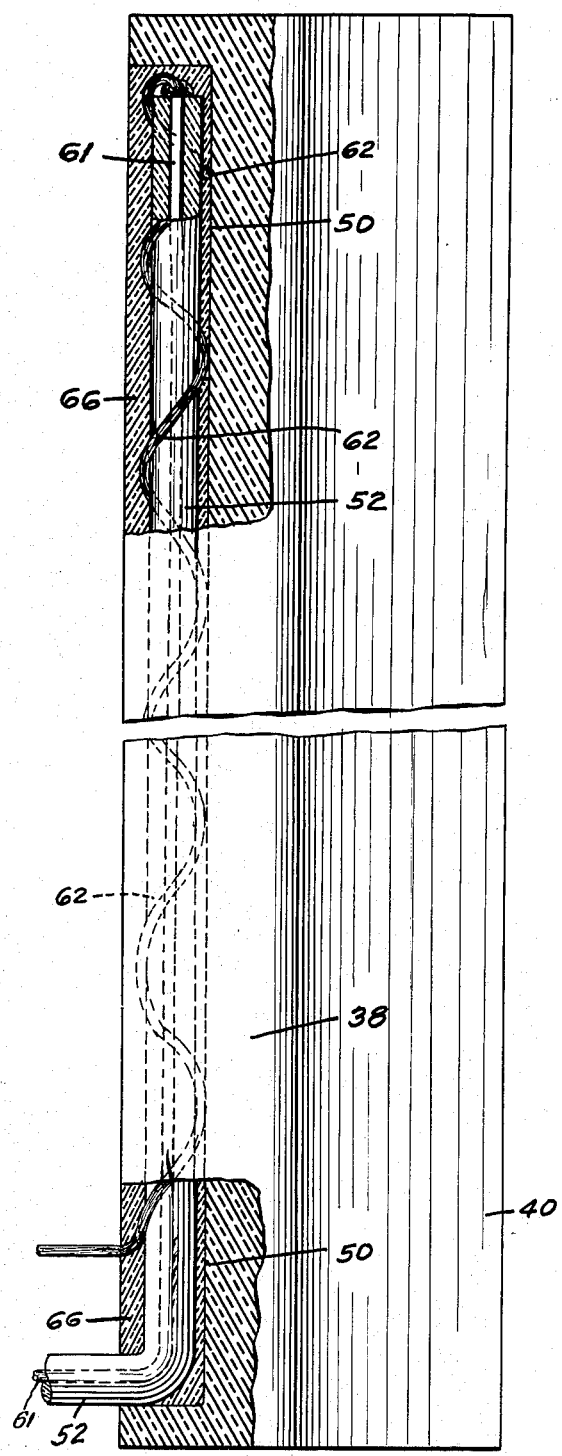
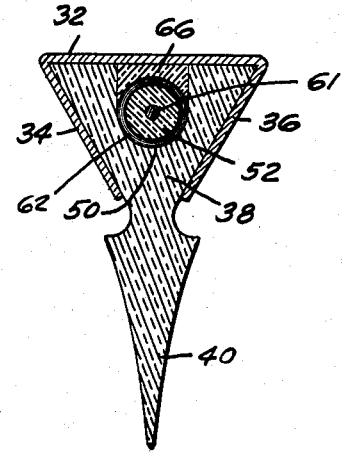
INVENTORS
WALTER F. KARSTENS
BY THOMAS J. VIDRICK
BY Harry H. Hitzeman
ATTORNEY.

United States Patent Office 2,733,472
Patented Feb. 7, 1956

2,733,472
HEATED WINDSHIELD WIPER BLADE

Walter F. Karstens and Thomas J. Vidrick,
Arlington Heights, Ill.

Application November 12, 1952, Serial No. 319,808

4 Claims. (Cl. 15—250.5)

Our invention relates to improvements in windshield wiper construction.

Our invention relates more particularly to the construction of a wiper blade provided with means for heating the same to prevent an accumulation of sleet or ice thereon.

As is well known in the art, modern automobiles, trains, airplanes, etc. are provided with means for defrosting the glass windshield, the means usually employing heated air blown against the inner surface of the same of sufficient intensity to warm the glass so that sleet or ice which forms on the outside surface of the glass is melted and wiped away by the blade of the windshield wiper. While this succeeds in cleaning the snow, sleet or ice from the windshield, it does not prevent the accumulation of ice or snow on the sides of the wiper blade itself. In freezing weather the blade of the windshield wiper has a tendency to accumulate snow and ice until the entire blade is covered with a frozen coating which then slides over the surface of the glass without effecting any cleaning or wiping action. As a result, operators of vehicles are frequently required to manually clean the accumulated snow and ice from the windshield wiper blade itself.

The principal object of our invention is to provide a construction of wiper blade which has means therein for heating the same, thereby eliminating the possibility of having a frozen coating on the surface of the blade. In addition, the small amount of heat which is required in the blade keeps the blade from becoming stiff in lowered temperatures, and in warmer temperatures such as in rain, assist materially in cleaning the moisture off the surface of the window.

A further object of the invention is to provide a wiper blade having a comparatively simple heating element in the same and a wire extending therefrom capable of connection to the ignition switch or other desired switch, the construction being such that the attachment of the same in any standard windshield wiper can be easily and simply effected.

A further object of the invention is the construction of a windshield wiper blade having a heating element therein, the construction of the blade being such that it may be applied in any of the standard windshield wipers at present on the market.

Other objects and advantages will be more apparent from the following description wherein reference is had to the accompanying drawings, upon which—

Fig. 1 is a side elevational view showing the general installation of windshield wiper and blade, the windshield or window being shown in cross-section;

Fig. 2 is an enlarged fragmentary side elevational view showing one form of wiper blade operating mechanism which may be employed with our improved blade;

Fig. 3 is an enlarged cross-sectional view taken on the line 3—3 of Fig. 2; and

Fig. 4 is an enlarged side elevational view of a wiper blade constructed in accordance with our invention, parts thereof being broken in section to more clearly show other parts.

In the embodiment of the invention which we have chosen to illustrate and describe the same, we have shown an installation of the windshield wiper on the windshield of an automotive vehicle, it being understood that similar installations can be made on airplanes, street cars, trucks, buses, motor boats and other types of vehicles which are provided with a windshield in front of the driver.

The windshield wiper may include a shaft 10 which is driven in a well known manner to oscillate back and forth. The shaft 10 may carry a spring arm 12 which is connected by an arm attaching ear 14 to a spring bridge member 16. The bridge member 16 has a pair of end ears 18 and 20 which connect under tension to a pair of brackets 22 and 24 that are fastened to the two parts 26 and 28 of the wiper blade holder 30.

The wiper blade holder, as best shown in Fig. 3, may have a top wall 32 and a pair of inwardly inclined side walls 34 and 36 to receive the tapered head 38 of a wiper blade 40. The wiper blade is inserted into the holder from one end of the same, the holder having a pair of ears 42 and 44 at the ends of the same, and the ears being capable of being bent parallel to the wall 32 to permit the introduction of the tapered head 38 of the wiper blade. After it has been inserted, the ears are bent down to the position shown in the drawings.

In providing a heating element in a wiper blade, we prefer to have the blade molded with a groove 50 in the upper end of the head 38, the groove extending generally throughout the length of the blade. The heating element 52 may preferably consist of a stranded bell conductor wire that is plastic coated, the wire being of a size that will lie snugly in the groove 50. One end of the heating element may extend outwardly through an opening in the top wall 32 of the blade holder 30 at the lower end of the same and extend upwardly through a pair of loops 56 and 58 and then downwardly on the back of the spring arm 12, the conductor wire being preferably fastened thereto by a pair spring clip members 60.

The wire may extend in any suitable manner to the wiper actuating switch from where it may be suitably connected to a source of current in the vehicle. The strands of the conductor wire 61 inside of the plastic conduit may extend out of the upper end of the same and be connected to a .0045 Advance Nichrome Resistance wire 62 that is spirally wrapped as shown about the plastic coating of the wire, the lower end of the same being attached to a suitable ground such as the wiper blade holder 30 by a drop of solder, as shown at 64. Prior to this connection, however, the groove 50 in the upper end of the head 38 of the wiper blade is filled with live rubber 66 and heated and vulcanized so that the heater element is completely insulated and fixedly held in position in the groove 50, the only portion thereof exposed being the end that is attached by the solder at 64 to the wiper blade holder.

With the above construction, it can be seen that we have provided a heating element which is comparatively simple to construct and which may be applied to any of the standard wiper blades on the market in such manner that the wiper blade can be attached to the standard wiper blade holders in a short time and by a very simple operation. The insulation or coating of the conductor wire serves as a support for the strands of the resistance wire which are spirally wound around the same, and when the windshield wiper is operated and current flows through the heater element, it will cause the body of the wiper blade to become sufficiently warm so that it will melt sleet or snow which would otherwise accumulate on the same.

In addition, the wiper blade will have a longer life due to the fact that by keeping the same warm it will not become hardened or "dead" and caused to deteriorate in cold or inclement weather. Further, when a warm wiper blade is being used to remove rain or other moisture, the heat in the blade will tend to make the blade more flexible, thereby making it more efficient in removing moisture on the surface of the window, and causing a more complete cleaning operation on the window.

We contemplate that changes and modifications may be made in the exact details shown and we do not wish to be limited in any particular; rather what we desire to secure and protect by Letters Patent of the United States is:

1. A flexible rubber blade for windshield wipers, said blade having a head portion, a heating element embedded in said head portion, said heating element comprising a coated conductor wire extending the length of said wiper blade, a resistance wire extending from one end of said conductor wire and wound around the coating of said conductor wire as a support therefor, said heating element placed in a groove in the upper surface of said head portion with rubber vulcanized over the end of the groove to seal the entire heating element in place.

2. The combination with a windshield wiper having a shaft, a spring arm carried thereby, a bridge member, an ear on said bridge member for attachment to said spring arm, a wiper blade holder carried by said bridge member, of a wiper blade of flexible material mounted in said holder, said wiper blade having a heating element embedded therein throughout the length of the same, said heating element consisting of an insulated conductor wire, an exposed resistance wire connected to one end of said insulated conductor and wrapped around said insulated conductor wire and grounded to said blade holder.

3. The combination with a windshield wiper having a shaft, a spring arm carried thereby, a bridge member, an ear on said bridge member for attachment to said spring arm, a wiper blade holder carried by said bridge member, of a wiper blade of flexible material mounted in said holder, said wiper blade having a heating element embedded therein throughout the length of the same consisting of an insulated conductor wire with a length of exposed resistance wire extending from one end of the same and wound around and in contact with the insulated conductor wire to a point adjacent the other end of the same, and grounded at the lower end of said blade holder, the other end of said conductor wire extended to a source of current.

4. A windshield wiper including a shaft, a spring arm carried thereby, a bridge member, an ear on said bridge member for attachment to said spring arm, an elongated wiper blade holder carried by said bridge member, an elongated rubber wiper blade mounted in said holder, said wiper blade having a triangularly shaped head, a heating element embedded therein, said heating element consisting of a coated insulated wire extending the length of said blade and a resistance wire spirally wound around the coating on said insulated wire, said resistance wire connected to one end of said insulated wire and grounded at the lower end of said blade holder, the other end of said insulated wire extended to a source of current.

References Cited in the file of this patent

UNITED STATES PATENTS

| | | |
|---|---|---|
| 840,060 | Hill | Jan. 1, 1907 |
| 1,642,570 | Wood et al. | Sept. 13, 1927 |
| 1,733,948 | Deuel et al. | Oct. 29, 1929 |
| 1,980,254 | Cartwright | Nov. 13, 1934 |
| 2,022,519 | Payne | Nov. 26, 1935 |
| 2,302,780 | Le Clair | Nov. 24, 1942 |

FOREIGN PATENTS

| | | |
|---|---|---|
| 627,403 | Great Britain | Aug. 8, 1949 |